(12) United States Patent
Wood et al.

(10) Patent No.: US 9,011,566 B2
(45) Date of Patent: Apr. 21, 2015

(54) FILTER CARTRIDGE APPARATUS

(71) Applicant: Filterspec Inc., Newmarket (CA)

(72) Inventors: Peter Wood, Pickering (CA); Indal Looknauth, Brampton (CA); Gord Heyting, Newmarket (CA)

(73) Assignee: Filterspec Inc., Ontario (CA)

( * ) Notice: Subject to any disclaimer, the term of this patent is extended or adjusted under 35 U.S.C. 154(b) by 36 days.

(21) Appl. No.: 13/688,620

(22) Filed: Nov. 29, 2012

(65) Prior Publication Data

US 2014/0144110 A1    May 29, 2014

(51) Int. Cl.
*B01D 46/00* (2006.01)
*A62B 23/02* (2006.01)

(52) U.S. Cl.
CPC .......... *A62B 23/02* (2013.01); *B01D 46/0036* (2013.01); *B01D 46/0002* (2013.01); *B01D 2259/4541* (2013.01); *B01D 46/0004* (2013.01); *B01D 46/0023* (2013.01)

(58) Field of Classification Search
CPC ........... B01D 46/0023; B01D 46/0036; B01D 53/0415; B01D 2259/4541; B01D 46/0002; B01D 46/0004; A62B 23/02
USPC ............. 55/482, 503, 524; 96/134, 135, 136, 96/290, 296
See application file for complete search history.

(56) References Cited

U.S. PATENT DOCUMENTS

| | | | | |
|---|---|---|---|---|
| 4,741,882 A * | 5/1988 | Weichselgartner | ........... | 422/122 |
| 4,964,900 A * | 10/1990 | Thompson et al. | ............. | 96/137 |
| 5,714,126 A * | 2/1998 | Frund | ............................ | 422/122 |
| 6,044,842 A * | 4/2000 | Pereira et al. | ............. | 128/202.27 |
| 7,311,764 B2 * | 12/2007 | Friday et al. | ..................... | 96/134 |
| 8,262,782 B2 * | 9/2012 | Schlaechter | .................... | 96/108 |
| 8,292,991 B2 * | 10/2012 | Friday et al. | ..................... | 96/134 |
| 2003/0164326 A1 * | 9/2003 | Eberl et al. | ..................... | 210/263 |

\* cited by examiner

*Primary Examiner* — Robert Clemente
(74) *Attorney, Agent, or Firm* — R. Neil Sudol; Henry D. Coleman

(57) ABSTRACT

A filter cartridge apparatus is provided for a respirator. The apparatus contains a wettable filter medium for use with a respirator in order to filter tritium, the filter medium being wetted when in use. The apparatus is also mountable to a cartridge containing a separate HEPA or other filter that is typically maintained in a dry state. Thus, a single unit containing both wet and dry filter media is provided for mounting to a respirator so that tritium or tritium water vapor and particulate contaminants can be filtered at the same time.

19 Claims, 5 Drawing Sheets

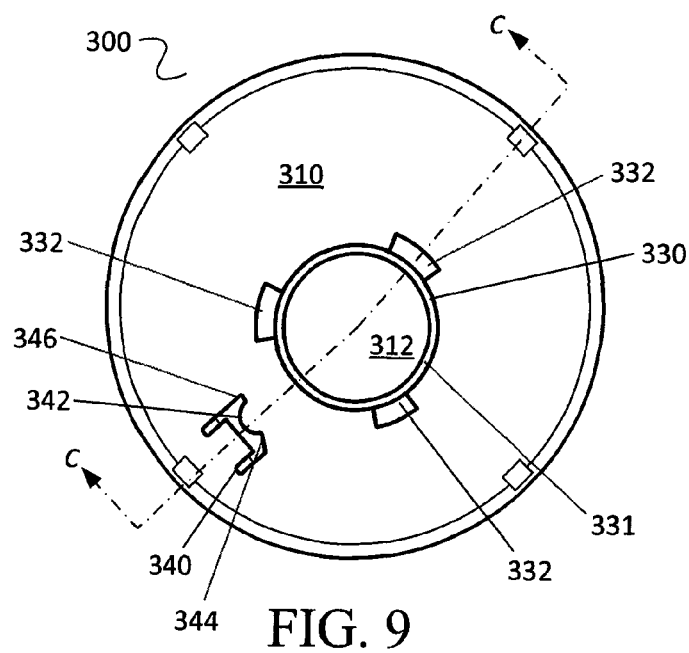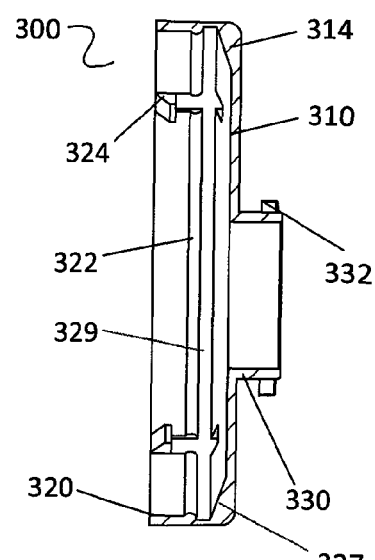
FIG. 9　　FIG. 10
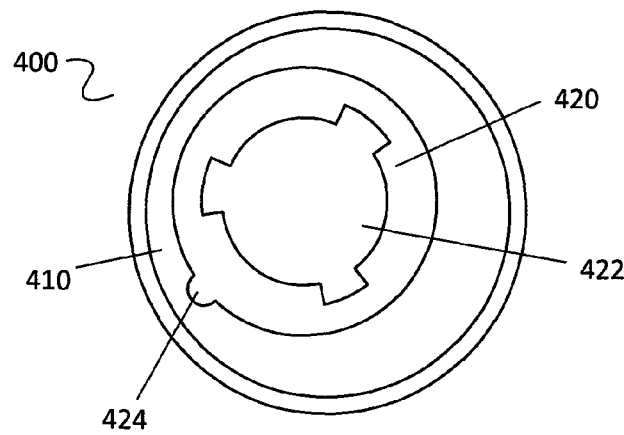
FIG. 11

FILTER CARTRIDGE APPARATUS

TECHNICAL FIELD

This disclosure relates to cartridges for respirators, and in particular to respirator cartridges for use in tritium filtration.

TECHNICAL BACKGROUND

In nuclear industry and nuclear research environments, a contamination risk is posed by the presence of tritium, typically in the form of tritiated water vapour. Tritium filters are therefore used in air-purifying respirators (in addition to whole-body protection as appropriate) to protect workers in tritium-contaminated environments. An air-purifying respirator must therefore either remove the tritiated water vapour or tritium from the air before it is inhaled by the worker, or else substitute the tritiated water vapour or air with normal water vapour air. As is known in the art, one type of filter medium used to filter tritium vapour in air-purifying respirators is a corrugated or pleated paper, which captures tritium by adsorption. However, to be effective in filtering tritium, the paper medium must be wetted.

A contaminated environment is not necessarily contaminated by a single contaminant. Airborne tritium or tritiated vapour may be accompanied by various types of particulates which can also be harmful to workers in the environment. Particulate filters, such as HEPA filters, can be used to filter out such contaminants. A tritium paper filter is insufficient to filter the particulates filtered by a HEPA filter, and a HEPA filter does not provide protection against tritium for any significant duration. HEPA filters, and other types of filters for respiratory protection, are ineffective or have reduced effectiveness when they are wetted; moisture in the HEPA filter medium can saturate the filter medium, blocking airflow, and may damage the filter medium itself.

BRIEF DESCRIPTION OF THE DRAWINGS

FIG. 9 is a top view of the cap of FIG. 6;

FIG. 10 is a cross-sectional view of the cap of FIG. 6; and

FIG. 11 is a view of a mating end of the particulate filter cartridge shown in FIG. 2.

DETAILED DESCRIPTION

Figure 1:
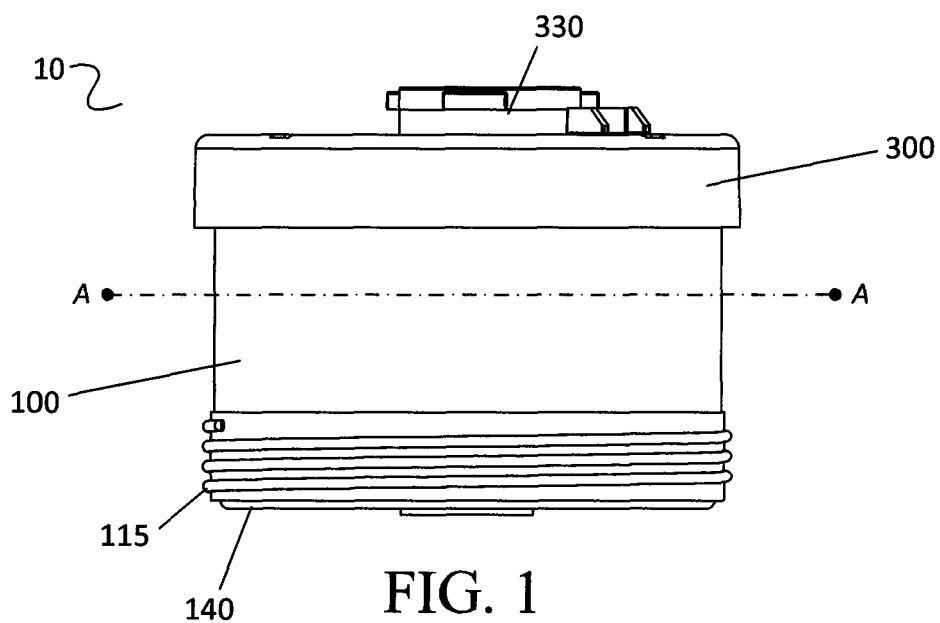
FIG. 1 is a front elevation view of an assembled filter cartridge apparatus.

There is therefore provided a filter cartridge apparatus for containing a wetted filter medium for use with a respirator in order to filter tritium. The apparatus 10 is also mountable to a cartridge containing a separate HEPA or other filter that is typically maintained in a dry state.

In one example, there is provided a respirator filter cartridge assembly comprising: a tritium filter cartridge comprising a wettable tritium filter medium; and a further filter cartridge removably mounted to the tritium filter cartridge, the further filter cartridge comprising a dry filter medium.

In one aspect, the wettable tritium filter medium is wetted.

In another aspect, the further filter cartridge is a particulate filter.

In still another aspect, the further filter cartridge is a HEPA filter.

There is also provided a filter cartridge apparatus for use in filtering tritium or tritium water vapour, comprising: a shell comprising an air-permeable base at an inlet end, the shell containing a wettable filter medium; and a cap engaged with an outlet end of the shell, the cap comprising an outlet and an adaptor portion surrounding the outlet, the adaptor portion being adapted for mounting to a separate filter cartridge such that the outlet is substantially aligned with an inlet of the separate filter cartridge.

In one aspect, the separate filter cartridge comprises a dry filter medium.

In another aspect, the wettable filter medium is wetted.

In still another aspect, the cap comprises a cover plate and a depending skirt, the cover plate and the depending skirt defining a shoulder in an interior of the cap, the depending skirt comprising a recess along an interior wall adjacent the shoulder and further comprising at least one mating portion for engaging a corresponding mating portion on the shell; and the shell comprises at least one such corresponding mating portion; and the filter cartridge apparatus further comprises a gasket retained in the recess and interposed between an upper edge of the outlet end of the shell and the shoulder to provide a substantially airtight seal between the cap and the shell when the at least one mating portion of the depending skirt is engaged with the at least one corresponding mating portion of the shell.

In yet another aspect, the adaptor portion is adapted for mounting to the separate filter cartridge with a substantially air-tight seal.

Still further, the inlet of the separate filter cartridge may comprise a flanged aperture and a protrusion for engaging a locking mechanism provided on a base of the separate filter cartridge, and the adaptor portion comprises a neck extending from the cover plate and surrounding the outlet, and having at least one flange corresponding to the flanged aperture; and a locking mechanism dimensioned to receive the protrusion of the separate filter cartridge; and the adaptor portion is adapted for mounting to the separate filter cartridge with a substantially air-tight seal using a gasket interposed around the neck between the cover plate and the at least one flange, the gasket retaining a face of the at least one flange against an interior surface of the base.

There is also provided a kit for use with a respirator, comprising: a filter cartridge apparatus for use in filtering tritium or tritium water vapour, comprising: a shell comprising an air-permeable base at an inlet end, the shell containing a wettable filter medium; and a cap engaged with an outlet end of the shell, the cap comprising an outlet and an adaptor portion surrounding the outlet, the adaptor portion being adapted for mounting to a separate filter cartridge such that the outlet is substantially aligned with an inlet of the separate filter cartridge; and the separate filter cartridge, the separate filter cartridge comprising a dry particulate filter.

Figure 2:
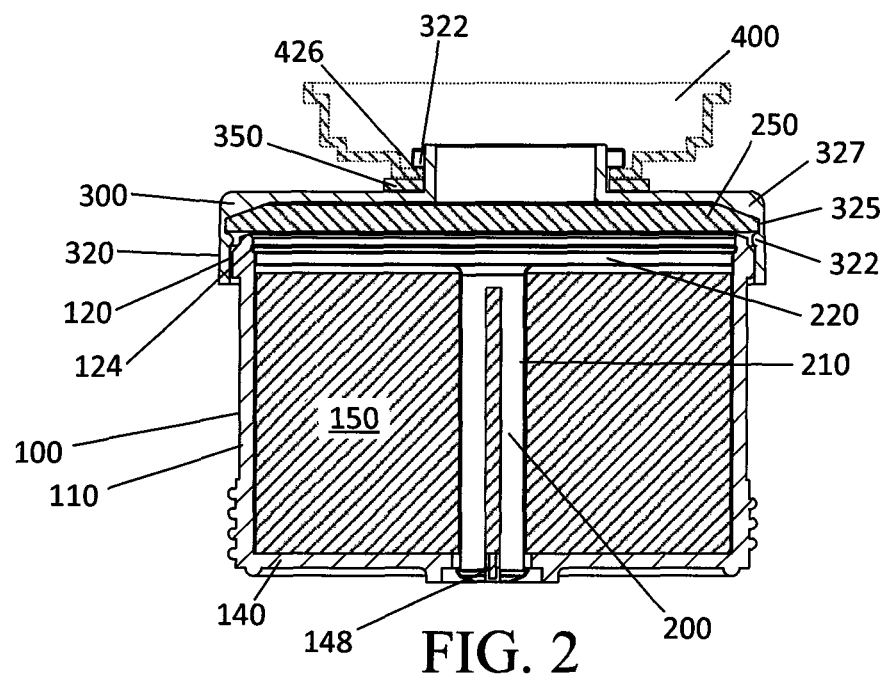
FIG. 2 is a cross-sectional view of the assembled filter cartridge apparatus of FIG. 1 with a separate particulate filter cartridge mounted thereon.

FIG. 1 shows an assembled filter cartridge apparatus 10, which includes a shell 100 and cap 300. The shell 100 contains the tritium filter medium (not shown in FIG. 1) and is provided with a mating portion 115, in this example a threaded end, for mounting on a full-face or half-face respirator, not shown. The apparatus 10 may be used in either a dual or single-mount respirator. A HEPA or other type of cartridge is mountable on the attachment 10 by means of a locking mechanism 330 on the cap 300, described in further detail below. A sectional view of the cartridge attachment 10 taken along the axis A-A is shown in FIG. 2. Inserted in the shell 100 is a spool 200 supporting the filter medium 150. In this example, the filter medium 150 can be a pleated paper filter strip of a type suitable for use in tritium filtration, which is anchored on the spool shaft 210 and wound around the shaft 210. When inserted in the shell 100, the filter medium 150 is retained between the shell base 140 and a rim 220 of the spool 200.

The cap 300 is mounted on the shell 100 by means of a locking mechanism (not shown in FIG. 2), discussed below. The shell 100 is seated within a skirt 320 of the cap 300 using a gasket 250 interposed between the interior face of the cap 300 and an upper opening of the shell 100. The cap 300, in turn, can be mounted to a separate HEPA or other particulate filter cartridge 400 (shown in phantom in FIG. 2) by means of a further locking mechanism, described with reference to FIGS. 7-11 below. The particulate filter cartridge 400 is seated on a gasket 350 mounted on the cap 300. Various features of the apparatus components and their assembly are discussed in further detail below.

Figure 3:
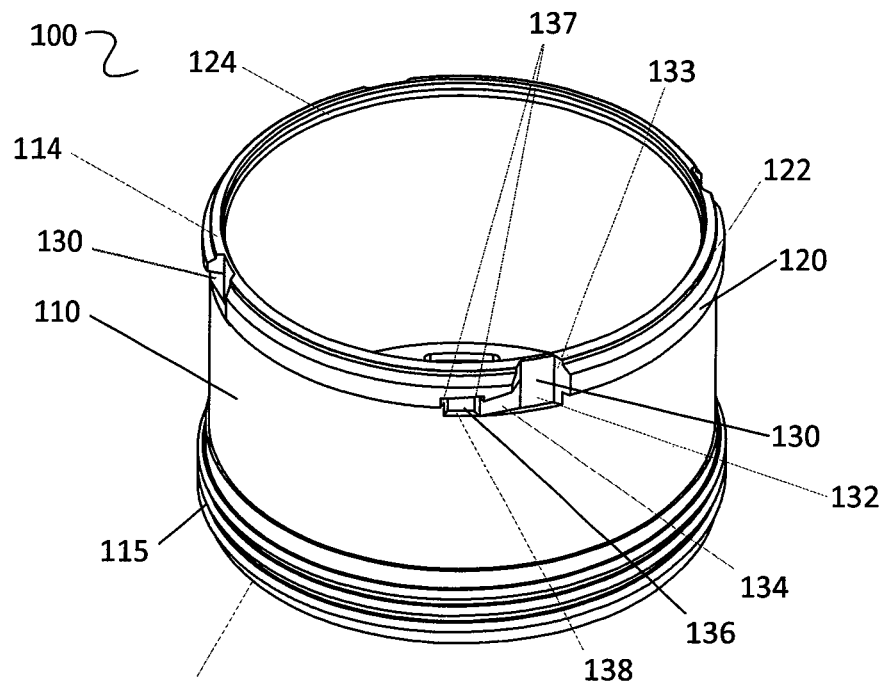
FIG. 3 is a perspective view of a shell of the filter cartridge apparatus of FIG. 1.

FIG. 3 shows a perspective view of the shell 100. The shell 100 in this example comprises a substantially cylindrical wall 110, which is a practical shape given the method by which the filter medium 150 is wound then inserted in the shell 100. In other examples, the shell 100 need not be cylindrical, but can take on any other suitable shape. The shell 100 is provided with a mating portion 115 at a first end 112 for attaching to a corresponding mating portion in a respirator, not shown; in this example, the cross-section of the shell 100 is circular so the mating portion 115 may be a screw thread, thus the exterior of the wall 110 is threaded. A bead 120 extends from the exterior surface wall 110 near the opposing end 114, creating a shoulder 122 formed by the bead 120 and the wall 110 between the opposing end 114 and the bead 120. A groove 124 is provided near the opposing end 114 along the interior of the wall 110.

The shell 100 is also provided with a further mating portion 130 at or near the opposing end 114, which in this example is the female portion of a bayonet-style mount, including a notch 132 in the wall 110 extending from the opposing end 114 and interrupting the bead 120, and, in this example, extending below the bead 120 and making an incursion into the wall 110 below the bead 120. The notch 132 is provided with angled sides 133 and is in communication with a ramp 134 extending from one side 133 of the notch 132 and terminating in a recess 136. The ramp 134 is recessed in the bead 120 and is of gradually decreasing depth as it extends from the notch 132 to the recess 136. The end of the ramp 134 terminating at the recess 136 is shallower than the recess 136, thus defining one of a pair of sidewalls 137 of the recess 136. A bottom wall 138 of the recess 136 extends between the sidewalls 137. In this example, the recess 136 makes some incursion into the wall 110 below the bead 120 and its depth is substantially the same as the maximum depth of the notch 132. At least one, and in this example, four, such mating portions 130 are provided in the shell 100. Multiple mating portions 130 may be equally spaced around the perimeter of the opposing end 114, although in some examples the mating portions 130 may not be evenly distributed around the perimeter to ensure that the cap 300 is mounted in a particular orientation on the shell 100.

Figure 4:
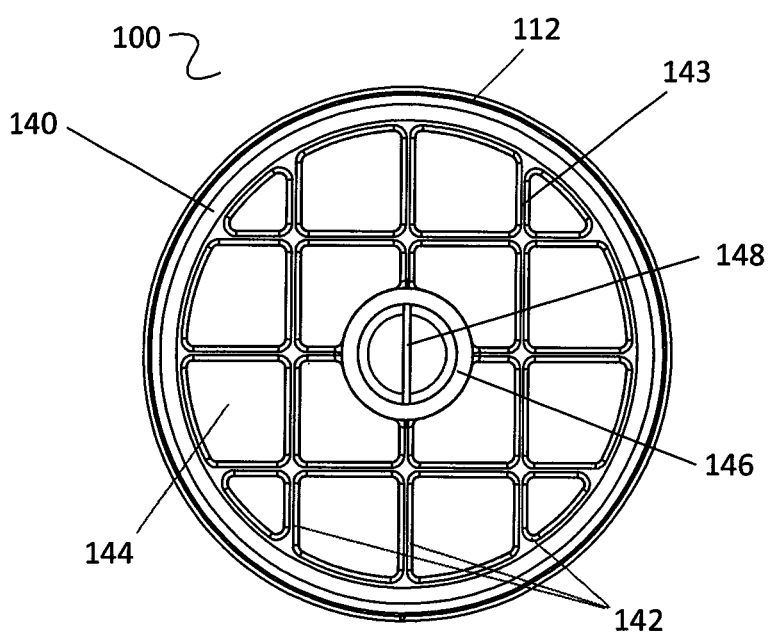
FIG. 4 is a bottom view of the shell of FIG. 3.

A bottom view of the shell 100 at the first end 112 is shown in FIG. 4. While the opposing end 114 is open, as can be seen in FIG. 3, the first end 112 is provided with an air-permeable base 140 which in this example comprises a mesh or grille 140 for retaining the filter medium inside the shell 100. In this example, the grille 140 comprises two series of slats 142 extending across the first end 112 and arranged at right angles, thus defining a grid. The grille 140 is thus air-permeable and provides an inlet for outside air since the apertures of the grid, e.g. 144, while of varying size in this example, are substantially larger than any gas (namely, air) or liquid that might be filtered or absorbed by the filter medium contained in the filter cartridge apparatus 10. The slats 142 may be reinforced by ribs 144 to provide additional strength in supporting the filter medium.

A central portion of the grille 140 is provided with a spool mount 146 for mounting the spool 200 thereon. The spool mount 146 in this example is substantially circular and shaped to receive the shaft 210 of the spool. In this example, the spool mount 146 is provided with a brace 148 which, as will be seen below, retains the spool 200 in fixed position within the shell 100.

The shell 100 and the apparatus 10 generally are of a suitable size for mounting on a facial respirator unit and for containing the quantity of filter medium 150 required for the intended application or environment. In this example, a suitable exterior diameter of the shell 100 is under 3 inches (e.g. 2.88 inches) and a suitable exterior height of the shell 100 is about 1.7 inches. The thickness of the wall 110 and depth of the bead 120, and the precise sizing of other features such as the various mating portions 115, 130 may be determined in part by the materials used to manufacture the various components of the filter cartridge apparatus 10 and by the characteristics of the mating components provided on any attachments, such as the respirator or particulate filter cartridge 400, while also preferably providing a sufficiently strong casing so as to prevent or reduce damage to the mating portions and the filter medium 150 during at least normal handling, shipping and installation. The various components may be formed, for instance, from a suitable plastic using injection molding or another appropriate manufacturing technique, with additional machining as necessary to provide the mating portions or other features of the apparatus. As another example, various components of the apparatus may be formed by metal stamping and machining.

Figure 5:
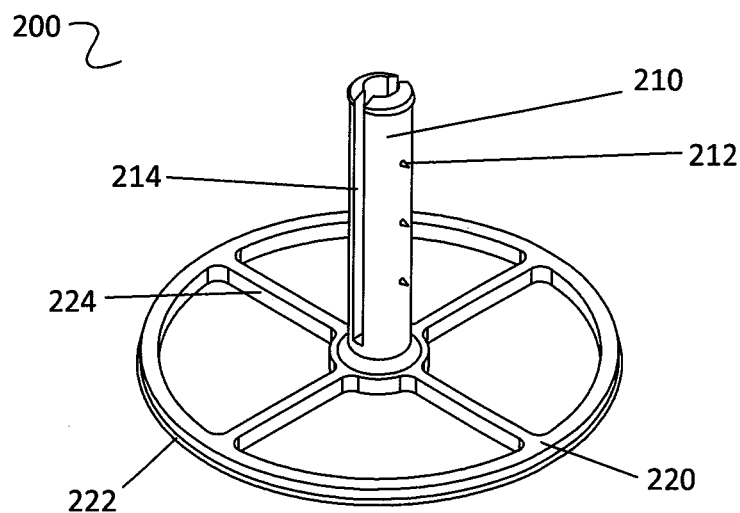
FIG. 5 is a perspective view of a spool of the filter cartridge apparatus shown in FIG. 2.

A perspective view of the spool 200 is shown in FIG. 5. The spool is used for coiled filter paper media; if the filter medium does not require coiling or winding, then the spool 200 may be omitted (as well as the spool mount 146 in the shell 100). A spool shaft 210 extends from a rim end and is substantially circular in cross-section with a notch 214 intersecting the shaft 210 along its diameter, and running substantially the length of the shaft 210 to the rim end. The notch 214 is sized to receive a layer of the filter paper medium. At least one tooth 212 emerges from the exterior surface of the shaft 210. In this example, a set of three teeth 212 is provided along the length of the shaft 210; more than one set of teeth 212 may be provided. The shaft 210 is mounted to the rim 220 by spokes 224. The use of spokes 224 permits filtered air to pass through the filter medium when installed in the apparatus 10. A bead or shelf 222 extends from the exterior perimeter of the rim 220.

Figure 6:
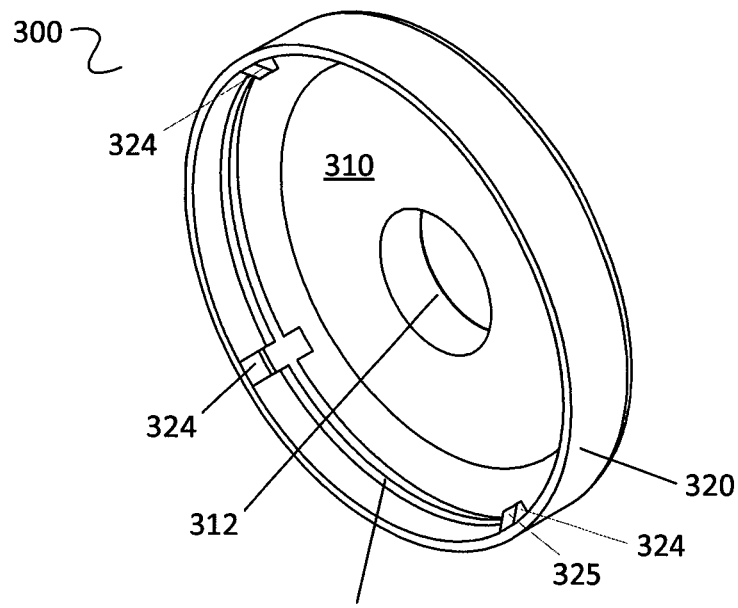
FIG. 6 is a perspective view of a cap for the filter cartridge apparatus of FIG. 1.

The cap 300, which is mounted on the other end of the shell 100, is illustrated in FIGS. 6 to 10. The perspective view of FIG. 6 shows an interior face 310 of the cap 300. The cap 300 includes a cover plate 310 and a skirt 320 depending from the cover plate 310. An aperture 312 is provided in the cover plate 310, and serves as an outlet for air passing through the shell 100. As will be seen more clearly in FIGS. 7-10, the aperture is circular but can be offset from the center of the cover plate 310. One or more mating portions 324, sized and shaped to cooperate with the mating portions 130 on the shell 100, are provided on the interior of the skirt 320. In this example, the mating portions 324 comprise pins or extrusions extending radially inwardly from the interior surface of the skirt 320, spaced to match the female mating portions 130. In this example the pins 324 are provided with an inclined face 325 to facilitate assembly with the shell 100. Also, in this example, the pins 324 are formed integrally with a bead or shelf 322 extending radially inwardly from the interior surface of the skirt 320. The position of the aperture 312 in the cover plate 310 can be seen more clearly in FIG. 7, which is a bottom view of the cap 300. The cap can also include one or more slots 328 through the cover plate 310.

Figures 7, 8:
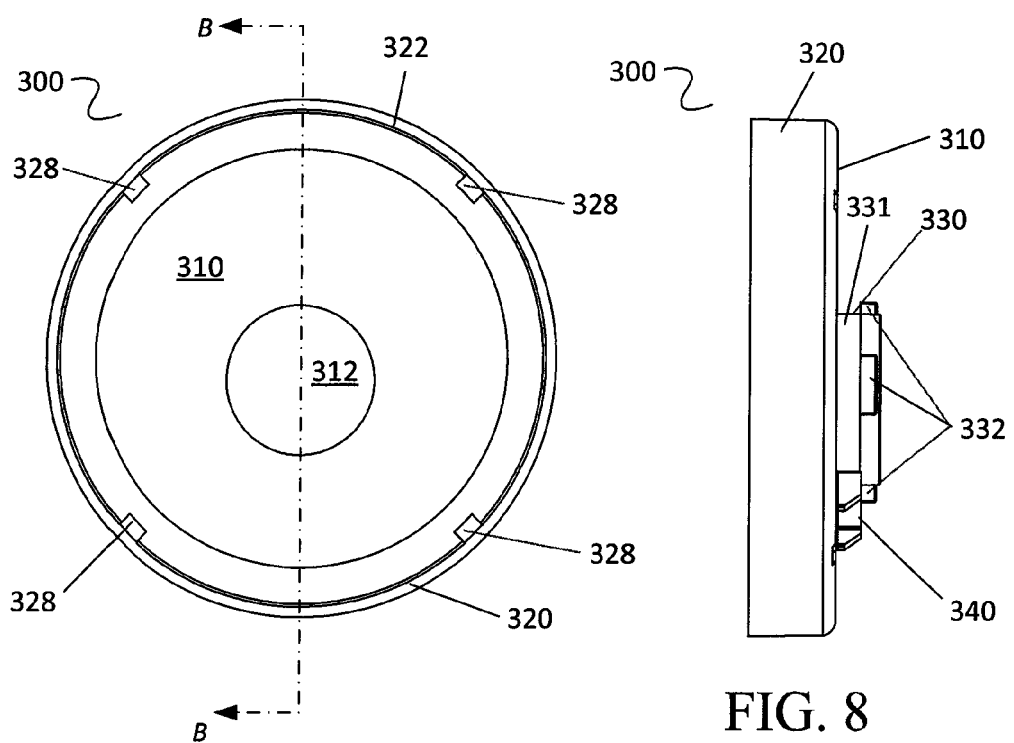
FIG. 7 is a bottom view of the cap of FIG. 6.
FIG. 8 is a side view of the cap of FIG. 6.

FIG. 8 provides a side view of the cap 300 along the axis B indicated in FIG. 7. Extending from the exterior surface of the cover plate 310 and surrounding the aperture 312 (not shown in FIG. 8) is an adaptor portion 330, which, to fit the particulate filter provided as an example, includes a neck 331 with a plurality of flanges 332 extending from an upper end of the neck 331. A locking mechanism 340 is also provided adjacent the neck 331. As can be seen in FIG. 9, which is a top view of the cap 300, the flanges 332 extend radially from the neck 331, and the neck 331 defines the perimeter of the aperture 312. Adjacent to, but spaced from, the neck 331 is a locking mechanism 340, which in this example extends from the surface of the cover plate 310 and comprises a ramp 344 leading to a recess 342 ending in a stop 346. The shape and position of the locking mechanism 340 on the cap 300 is arranged to cooperate with a mating portion of the particulate filter cartridge 400 to be mounted on the apparatus 10.

FIG. 10 is a cross-sectional view of the cap 300 along the axis C indicated in FIG. 9 more clearly showing the configuration of the interior of the skirt 320. The interior of the skirt 320 includes a recess 329 immediately adjacent the bead 322, and the interior of the cover plate 310 is angled around the perimeter so as to provide a slanted shoulder 327.

To assemble the apparatus 10, referring again to FIG. 2, a filter paper medium 150 is provided. The paper type can be a pleated or corrugated paper provided in an elongated strip having a width that is approximately the height of, or slightly shorter than, the spool shaft 210. An end of the strip is threaded through the notch 214, then wound around the shaft 210. The one or more teeth 212 provided on the shaft can grip the strip to hold it in place during winding. When winding is complete, the filter paper covers substantially the area of the rim 220, which may or may not include the shelf 222. The pleats or corrugations in the paper provide passageways for air flow.

The spool 200, with the filter medium 150 mounted thereon, is inserted shaft-first into the shell 100 so that the end of the shaft 210 engages the spool mount 146 and the brace 148 engages the notch 214 of the spool 200. Upon insertion the outer edge of the rim will be close to the end 114 of the shell 100. The spool is dimensioned such that the shelf 222 engages the groove 124 in the shell 100. Thus, if the filter medium 150 extends over the shelf 222, the filter medium 150 will be slightly compressed on insertion of the spool 200 into the shell 100. As those skilled in the art will appreciate, the filter paper medium type and configuration, as well as the strip dimensions, should be selected to be appropriate for the desired application and environment and to ensure sufficient airflow through the filter medium 150.

The cap 300 is then mounted on the shell 100 with an intermediate gasket 250, as shown in FIG. 2. The gasket is sized to fit the interior perimeter of the cap 300 snugly and is made from any suitable resilient material appropriate to the desired application and environment, e.g. silicone, buna rubber, or a closed-cell foam that provides sufficient resilience and deformation to provide a sufficiently airtight seal between the shell 100 and the cap 300. The wall of the skirt 320 is dimensioned to slidingly fit over the bead 120 and mating portions 130 of the shell 100, while the mating portion or portions 324 are sized and positioned to cooperate with the corresponding mating portions 130. The gasket 250 is retained in the recess 329 of the skirt, between the bead 322 and the shoulder 327 defined in the cap 300. To mount the cap 300 and gasket 250 on the shell 100, the pins 324 of the cap 300 are aligned with the notches 132 on the shell 100, and the cap 300 pushed towards the shell 100, thus compressing the gasket 250 and possibly forcing air out through the slots 328, and the cap 300 and shell 100 are rotated relative to each other to slide the pins 324 along the ramps 134 until the pins 324 engage the recesses 136. When the pressure on the cap 300 is released, the gasket 250 recovers somewhat and engages between the shoulder and the upper end 114 of the shell 100, with the result that the pins 324 engage the bottom wall 138 of the recesses. There is thus provided a sufficiently airtight seal between the cap 300 and the shell 100.

With the apparatus 10 thus assembled, the filter medium 150 can be wet through the aperture 312 provided in the cap 300, and/or the grille 140 provided on the shell 100 before the apparatus 10 is mounted to a particulate or other filter cartridge 400. Alternatively, the filter medium 150 can be wetted while on the spool 200, either before or after insertion in the shell 100 but before the cap 300 is mounted on the shell 100. At the time of mounting to a respirator, the entire apparatus can be provided in packaged form, pre-wetted. Regardless, inadvertent wetting of the other filter cartridge 400 while the filter medium 150 is being wetted is avoided.

The particulate filter cartridge 400 is then mounted to the cap 300. As noted above, the adaptor portion 330 of the cap 300 fits the particular particulate filter 400 provided as an example. FIG. 11 illustrates an exemplary mounting face of a third-party HEPA filter cartridge, such as the P100 Advantage™ filter provided by MSA, Cranberry Township, Pa., USA. A cross-section of the mounting face is shown in FIG. 2. The mounting face includes a base 410, emerging from which is a platform 420 of substantially level height provided with a flanged aperture 422, providing an inlet to the filter medium contained in the filter cartridge 400. The neck 331 and flanges 332 of the adaptor portion 330 on the cap 300 are dimensioned to be received in the aperture 422; the aperture 312 in the cap 300, which is surrounded by the neck 331 of the adaptor portion 330, and the aperture 422 are thus substantially aligned to permit airflow therethrough. The platform 420 includes a protrusion or nub 424 extending from a side of the platform 420 which cooperates with the locking mechanism 340 provided on the cap 300.

To assemble, referring also to FIG. 2 a gasket 350 made of similar material as the gasket 250 is placed around the neck 331 of the adaptor portion 330 of the cap 300. Some deformation of the gasket 350 can occur as the gasket 350 is passed over the flanges 332 on the neck 331. The filter cartridge 400 is then aligned with the cap 300 so that the flanges 332 pass through the flanged aperture 422. The cap 300 and the filter 400 are then rotated relative to each other so that the nub 424 meets the ramp 344 on the locking mechanism 340 on the cap 300. As force continues to be applied in rotating the cap 300 and/or the filter 400, the nub 424 slides along the ramp 344 until it engages the recess 342 and is retained within the recess 342. At the same time, the gasket 350 is somewhat compressed by the force of the installer joining the cap 300 and the filter cartridge 400. When the nub 424 engages the recess 342, pressure on the gasket 350 is released, thus forcing an interior surface 426 (indicated in FIG. 2) of the platform 420 to engage a lower surface of the flanges 322. Thus, a sufficiently airtight seal is provided between the cap 300 and the filter cartridge 400. The neck 331 also provides spacing between the dampened filter medium 150 in the shell 100 and the filter medium in the filter cartridge 400, reducing the incidence of the medium in the filter cartridge 400 being inadvertently wet by the filter medium 150. The filter cartridge 400 is removably mounted to cap 300, thus facilitating a change in either the filter cartridge 400 or the apparatus 10. Likewise, the cap 300 can be removed from the shell 100 to extract the filter medium 150, although in some cases the apparatus 10 may be disposed of intact.

As will be appreciated by those skilled in the art, the apparatus 10 provides an easily-assembled and effective solution for combining wet and dry filtering media on a single unit to be attached to a respirator. This solution is particularly useful in tritium-contaminated environments where additional particulate contaminants are present. The apparatus and components disclosed herein, however, are presented only by way of example and are not meant to limit the scope of the subject matter described herein. Other variations of the subject matter described above will be apparent to those in the art and as such are considered to be within the scope of the subject matter described herein. For instance, it will be understood by those skilled in the art that these examples need not be limited to tritium-filtering wet paper media and HEPA or similar type particulate filters; other types of filter media adaptable for containment in the shell 100 and cap 300 described herein, with or without the spool 200, can be used in the apparatus 10, and other types of third-party filter cartridges 400 can be mounted thereon. The locking mechanism 340 on the cap 300 may be modified to accommodate other mounting configurations on the other filter cartridge 400, but it will be appreciated that the gasketed adaptor portion 330 provides the substantially airtight seal desired in many working environments.

The invention claimed is:

1. A filter cartridge apparatus for use in filtering tritium or tritium water vapor, comprising:
   a shell comprising an air-permeable base at an inlet end and defining an edge at an outlet end, the shell containing a wettable filter medium; and
   a cap adapted to engage the outlet end of the shell, the cap comprising:
      a cover plate comprising an outlet;
      an adaptor portion surrounding the outlet;
      a skirt depending from the cover plate, the skirt comprising a recess defined by a shoulder extending inwardly from an interior face of the skirt; and
   a gasket mounted in the recess, the gasket being interposed between the edge of the shell outlet end and the shoulder to provide a substantially airtight seal between the cap and the edge of the shell outlet end when the cap and shell are engaged, the gasket permitting air flow from the inlet end of the shell to the outlet of the cap,
   the adaptor portion being adapted for mounting to a separate filter cartridge such that the outlet is substantially aligned with an inlet of the separate filter cartridge.

2. The filter cartridge apparatus of claim 1, wherein the separate filter cartridge comprises a dry filter medium.

3. The filter cartridge apparatus of claim 2, wherein the wettable filter medium is wetted.

4. The filter cartridge apparatus of claim 1, wherein the cap comprises at least one mating portion for engaging a corresponding mating portion on the shell, and further wherein the shell comprises at least one such corresponding mating portion.

5. The filter cartridge apparatus of claim 1, wherein the adaptor portion is adapted for mounting to the separate filter cartridge with a substantially air-tight seal.

6. The filter cartridge apparatus of claim 5, wherein when the inlet of the separate filter cartridge comprises a flanged aperture and a protrusion for engaging a locking mechanism provided on a base of the separate filter cartridge, the adaptor portion comprises:
   a neck extending from the cover plate and surrounding the outlet, and having at least one flange corresponding to the flanged aperture; and
   a locking mechanism dimensioned to receive the protrusion of the separate filter cartridge; and
   the adaptor portion is adapted for mounting to the separate filter cartridge with a substantially air-tight seal using a gasket interposed around the neck between the cover plate and the at least one flange, the gasket retaining a face of the at least one flange against an interior surface of the base.

7. The filter cartridge apparatus of claim 1, wherein the separate filter cartridge is a particulate filter.

8. The filter cartridge apparatus of claim 1, wherein the separate filter cartridge is a HEPA filter.

9. A respirator filter cartridge assembly comprising:
   a shell for receiving a wettable filter medium and comprising an inlet end having an air-permeable base and an open outlet end configured to mount to a cap, the open outlet end defining an edge;
   the cap, comprising a cover plate and depending skirt, the skirt comprising an interior shoulder proximate to an interior face of the cover plate, the cover plate comprising an outlet and adaptor on an exterior face of the cover plate; and
   a gasket retained between the interior shoulder and the interior face of the cover plate, the gasket being compressed between the open outlet end of the shell and the interior face of the cover plate when the shell is mounted to the cap, the gasket permitting air flow from the inlet end of the shell to the outlet of the cap.

10. The respirator filter cartridge assembly of claim 9, further comprising the wettable filter medium.

11. The respirator filter cartridge assembly of claim 10, wherein the wettable filter medium is a tritium or tritium water vapor filter.

12. The respirator filter cartridge assembly of claim 9, further comprising a separate filter cartridge mounted to the respirator filter cartridge assembly by the adaptor.

13. The respirator filter cartridge assembly of claim 12, wherein the separate filter cartridge comprises a dry filter.

14. The respirator filter cartridge assembly of claim 13, wherein the dry filter comprises a HEPA filter.

15. A kit for use with a respirator, the kit comprising:
   a shell for receiving a wettable filter medium and comprising an inlet end having an air-permeable base and an open outlet end configured to mount to a cap, the open outlet end defining an edge;
   the cap, comprising a cover plate and depending skirt, the skirt comprising an interior shoulder proximate to an interior face of the cover plate, the cover plate comprising an outlet and adaptor on an exterior face of the cover plate configured for mounting to a separate filter cartridge;
   a gasket retained between the interior shoulder and the interior face of the cover plate, the gasket being compressed between the open outlet end of the shell and the interior face of the cover plate when the shell is mounted to the cap, the gasket permitting air flow from the inlet end of the shell to the outlet of the cap; and the wettable filter medium.

16. The kit of claim 15, further comprising the separate filter cartridge.

17. The kit of claim 16, wherein the separate filter cartridge comprises a dry particulate filter.

18. The kit of claim 16, wherein the separate filter cartridge comprises a HEPA filter.

19. The kit of claim 16, wherein the wettable filter medium is provided in the shell, and the wettable filter medium is pre-wetted.

* * * * *